(12) United States Patent
Wu et al.

(10) Patent No.: US 9,273,905 B2
(45) Date of Patent: Mar. 1, 2016

(54) DEACIDIFICATION PROCESS AND APPARATUS THEREOF

(75) Inventors: Chunlei Wu, Guangzhou (CN);
Xianjian Duan, Guangzhou (CN);
Chengkun Long, Guangzhou (CN);
Yuelin Wang, Guangzhou (CN)

(73) Assignee: GUANGZHOU GBS HIGH-TECH & INDUSTRY CO., LTD., Guangzhou (CN)

( * ) Notice: Subject to any disclaimer, the term of this patent is extended or adjusted under 35 U.S.C. 154(b) by 85 days.

(21) Appl. No.: 14/362,076

(22) PCT Filed: Mar. 23, 2012

(86) PCT No.: PCT/CN2012/072949
§ 371 (c)(1),
(2), (4) Date: Oct. 14, 2014

(87) PCT Pub. No.: WO2013/078802
PCT Pub. Date: Jun. 6, 2013

(65) Prior Publication Data
US 2015/0044128 A1    Feb. 12, 2015

(30) Foreign Application Priority Data

Nov. 30, 2011    (CN) .......................... 2011 1 0391335

(51) Int. Cl.
*B01D 53/40* (2006.01)
*B01D 53/68* (2006.01)
(Continued)

(52) U.S. Cl.
CPC .............. *F27D 17/001* (2013.01); *B01D 53/40* (2013.01); *B01D 53/685* (2013.01); *B01J 19/00* (2013.01); *F23J 15/02* (2013.01); *F27D 1/0033* (2013.01); *B01D 46/0068* (2013.01);
(Continued)

(58) Field of Classification Search
CPC .... B01D 46/0068; B01D 53/40; B01D 53/68; B01D 2257/2045; B01J 19/00; C01B 33/12; C01B 33/18; F23J 15/02; F27D 17/001
See application file for complete search history.

(56) References Cited

U.S. PATENT DOCUMENTS

2006/0093543 A1* 5/2006 Morters .................. C01B 33/12
423/335
2006/0286028 A1* 12/2006 Schumacher ......... C01B 13/145
423/659

FOREIGN PATENT DOCUMENTS

CN    1546373    11/2004
CN    1222472    10/2005
(Continued)

*Primary Examiner* — Timothy Vanoy
(74) *Attorney, Agent, or Firm* — Hamre, Schumann, Mueller & Larson, P.C.

(57) ABSTRACT

A deacidification apparatus and a deacidification process using the apparatus are disclosed. The deacidification apparatus includes a deacidification furnace, of which a furnace upper section, a furnace middle section and a furnace lower section are provided in upper, middle and lower portions respectively, wherein a gas-solid mixture inlet (1), a exhaust outlet (3) and a filtered air port (2) are provided on the furnace upper section, a product outlet (13) is provided on the furnace lower section, the upper portion of the deacidification is mounted with a filter (5) to which the gas-solid mixture inlet (1), the exhaust outlet (2) and the filtered air port (3) are connected, the filtered air port (2) is connected with a gas pulse device and a vacuum device by a three-way connecting device, and the exhaust outlet (3) is connected with atmosphere or connected with the vacuum device.

10 Claims, 1 Drawing Sheet

(51) Int. Cl.
*B01D 46/00* (2006.01)
*C01B 33/12* (2006.01)
*C01B 33/18* (2006.01)
*B01J 19/00* (2006.01)
*F27D 17/00* (2006.01)
*F23J 15/02* (2006.01)
*F27D 1/00* (2006.01)

(52) U.S. Cl.
CPC ........ *B01D 2257/2045* (2013.01); *C01B 33/12* (2013.01); *C01B 33/18* (2013.01); *F23J 2217/101* (2013.01)

(56) References Cited

FOREIGN PATENT DOCUMENTS

| | | | | |
|---|---|---|---|---|
| CN | 1687246 | | 10/2005 | |
| CN | 1238252 C | * | 1/2006 | ............ C01B 33/107 |
| CN | 1923683 | | 3/2007 | |
| CN | 101357317 | | 2/2009 | |
| CN | 101372317 | | 2/2009 | |
| CN | 101786632 | | 7/2010 | |
| CN | 201737707 | | 2/2011 | |
| CN | 201962079 | | 9/2011 | |
| EP | 0709340 | | 5/1996 | |

* cited by examiner

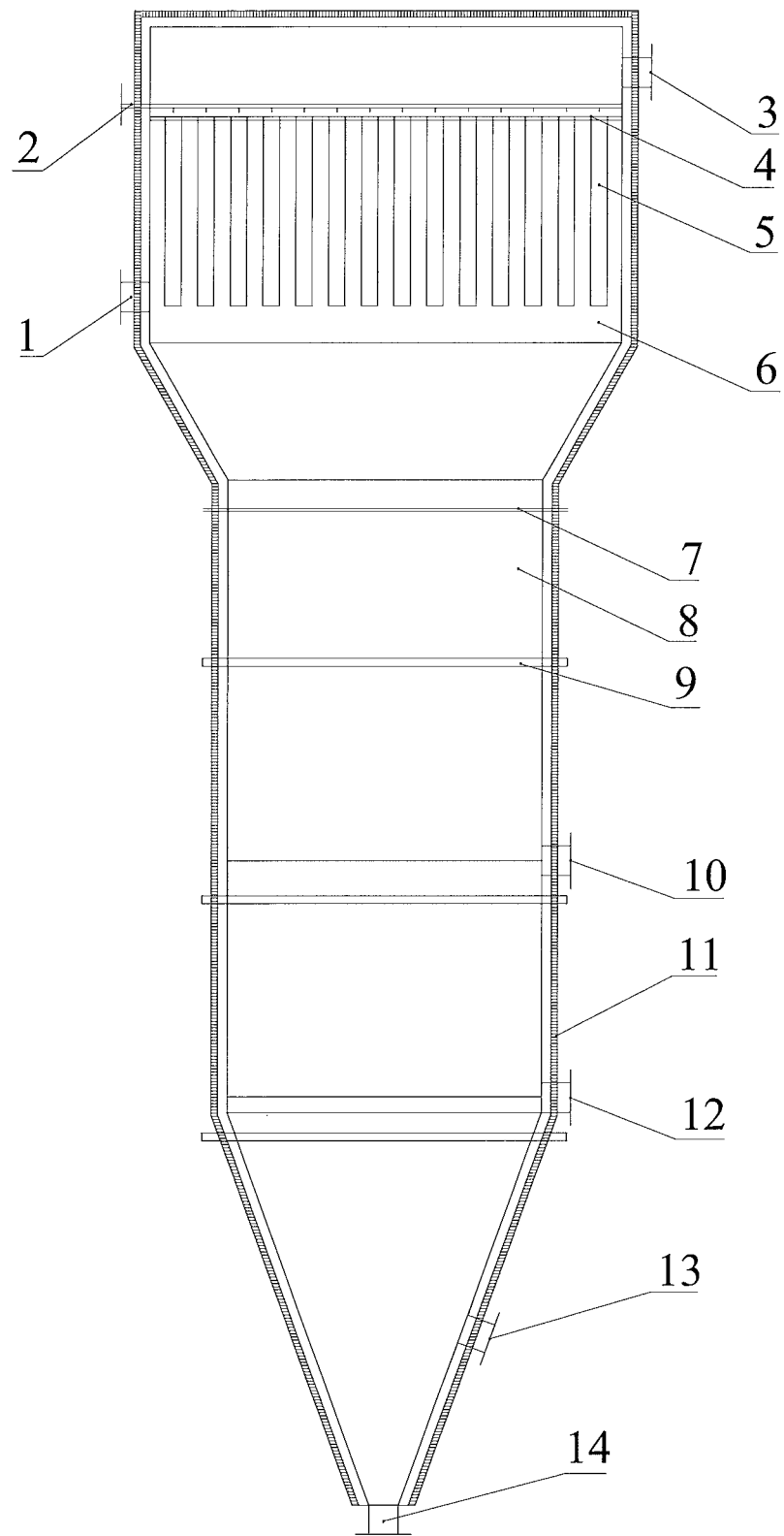

DEACIDIFICATION PROCESS AND APPARATUS THEREOF

TECHNICAL FIELD

The present invention relates to a deacidification apparatus and a deacidification process using the apparatus.

BACKGROUND

A pyrogenic oxide is an oxide powder material prepared from the hydrolysis-polycondensation of halide such as silicon tetrachloride, methyl trichlorosilane, titanium tetrachloride and aluminium chloride, used as a raw material at high temperatures. The principle of the hydrolysis-polycondensation is as follows:

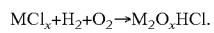

$MCl_x + H_2 + O_2 \rightarrow M_2O_xHCl$.

It can be known from the above reaction equation that a hydrogen chloride gas is generated during the course of reaction. This gas makes the oxide powder material have strong acidity by adsorbing at its surface and affects its application. Thus it generally needs to remove the acid gas absorbed at the surface of the oxide powder material by deacidifying during the production.

The existing deacidification technology uses a high temperature desorption with assisted deacidification medium way for deacidification, i.e., the acid gas adsorbing at the surface of the oxide powder material can be desorbed at high temperatures by burning, electrical heating or infra-red heating to achieve deacidification. The deacidification apparatus to be used is a vertical or horizontal deacidification furnace which uses internal heating, jacket heating, infra-red heating or the like. As ZL 02149782.6 or ZL 200410051507.6, arranging heating tubes in the deacidification furnace in a crossover manner, heating to 450~750° C., and supported by a deacidification medium such as hot air, water vapor or the like, for deacidification, the desorbed is discharged together with the deacidification medium. The traditional technology has defects which cannot be overcome by itself. Firstly, the deacidification requires a high temperature that the temperature should remain in 400~750° C. inside the furnace, which leads to great energy consumption during deacidification. Secondly, the powder material is easy to be discharged with the deacidification medium, so it needs to provide a filter such as bag-type dust remover in the exhaust outlet of the deacidification furnace, but the filter is likely to bring blocking, which causes the pressure of the system to destabilize. Further, the deacidification in traditional technology is inefficient, in order to assure that the acid gas adsorbing at the surface of the powder material can be effectively removed, the height (length) of the deacidification furnace is relatively large to ensure the powder material can stay in the furnace long enough, and sometimes even the second or third deacidification is needed to ensure the PH value of the suspension 4 wt % aqueous solution of the deacidified product is larger than 3.6.

ZL 200810058544.8 uses an infra-red heating way for deacidification. The principle of infra-red heating is that the water and HCL molecules in the powder rotate quickly and rub against each other to generate heat to heat the powder with the action of a microwave alternating electromagnetic field, which requires high water content in the powder that is regularly more than 10%. For a powder material prepared from pyrolysis, the water content is at a low level during production of the powder material, and the powder material forms a branch structure of spherical particles held together loosely, such that the loose structure tends to be collapsed after it is processed at high temperature in high water content, resulted in the collapse of the structure that it is easy to lose the specific features of the superfine powder from pyrolysis such as thickening, thixotropy, extinction and so on. Moreover, the processing efficiency of the microwave heating per apparatus time is relatively low, so it is not good for mass powder deacidification.

SUMMARY OF THE INVENTION

A principal object of the present invention is to provide a deacidification apparatus with low-energy and high efficiency.

In order to achieve the purpose of the present invention, the following solution is presented.

According to one aspect of the present invention, a deacidification apparatus includes a deacidification furnace, of which a furnace upper section, a furnace middle section and a furnace lower section are provided in upper, middle and lower portions respectively, wherein a gas-solid mixture inlet, a exhaust outlet and a filtered air port are provided on the furnace upper section, a product outlet is provided on the furnace lower section, the upper portion of the deacidification is mounted with a filter to which the gas-solid mixture inlet, the exhaust outlet and the filtered air port are connected, the filtered air port is connected with a gas pulse device and a vacuum device by a three-way connecting device, and a plurality of valves are used, wherein when vacuumizing, a valve connected with the gas pulse device is closed, and when delivering pulsed gas, a valve connected with the vacuum device is closed, and the exhaust outlet is connected with atmosphere or connected with the vacuum device.

In some embodiments, the furnace upper section is provided with a filter plate by which the filter is mounted on the furnace upper section.

In some embodiments, the furnace middle section is cylindrical, the furnace lower section forms a cone with a decreasing diameter downward, and the diameter of the furnace upper section is larger than that of the furnace middle section.

In some embodiments, the filter has a high breathable film cartridge or ceramic cartridge, the cartridge has a pore size of 1 to 10 um, and a porosity of more than 80%, and more preferably, the cartridge can be a ceramic cartridge which has high temperature resistant and acid and alkali resistant.

In some embodiments, an assisted heating system is provided in the furnace middle section and furnace lower section, a superheated vapor inlet and a high temperature air inlet are provided in the furnace middle section, a slag discharging outlet is provided on the bottom of the furnace lower sections, and the assisted heating system carries on high temperature deacidification by heating and assisted deacidification by the superheated vapor and the high temperature air.

In some embodiments, the deacidification furnace is covered by a layer of heat insulation material with a thickness of 20-100 mm. The layer of heat insulation material is prepared by mixing 20~80 wt % porous superfine powder, 0~30 wt % reinforcement fiber, 0~10 wt % binding material and 0~40 wt % heat radiation cover agent evenly and then pressing the mixture; the superfine powder can be one or more selected from the group consisting of fumed silica, silica aerogel, precipitated silica, silicoglaserite and vermiculite, the reinforcement fiber can be one or more selected from the group consisting of glass fiber, quartz glass fiber, boron fiber and ceramic fiber, the binding material can be one or more selected from the group consisting of water glass, silane coupling agent and resin, the heat radiation cover agent can be one or two members selected from the group consisting of titanium dioxide and silicon carbide, and the superfine powder, the reinforcement fiber, the binding material and the heat radiation cover agent are accounted for 100%.

Another object of the present invention is to provide a deacidification process.

In order to achieve the above object, the following solution is presented.

A deacidification process includes:

step a, delivering a gas-solid mixture containing powders into a filter by the gas-solid mixture inlet of the above deacidification apparatus, closing the valve connected with the gas pulse device, carrying out suction filtration under vacuum, removing the acid gas on the surface of the mixture from the surface of the powder, and discharging the acid gas through the exhaust outlet of the deacidification apparatus; and step b, driving the filtered powder into the furnace middle section of the deacidification furnace of the above deacidification apparatus, carrying out high temperature deacidification by heating from the assisted heating system, and carrying out assisted deacidification by delivering superheated vapor and high temperature air to further remove the acid gas adsorbing at the surface of the powder.

In some embodiments, in step a, the pressure exerted in the suction filtration is −4000~−8000 Pa, a pulsed gas is applied to the filter every 30~600 seconds for reversing and flapping during the suction filtration to remove the powder adsorbing at the surface of the filter, and the valve connected with the vacuum device is closed when applying the pulsed gas.

In some embodiments, in step b, the delivered superheated vapor has a temperature of 110~180 degrees Celsius, and the delivered high temperature air has a temperature of 100~300 degrees Celsius.

The present invention has the following advantages.

1. In traditional deacidification technologies, a filtration apparatus such as bag-type dust remover is usually added in the exhaust outlet in to prevent powder from loss, but it likely to cause blocking to the filter and increase resistance to the system, to bring a large fluctuation to the system pressure, which affect the stability of the product quality. The present invention relates to a high temperature and high acid environment, but the traditional bag-type dust remover does not survive high temperatures so it is more likely to cause bag melting to affect the service life. The present invention uses negative pressure to remove the acid gas adsorbing at the surface of the powder material by the ceramic filter and filters the powder material effectively to overcome the defect that the powder material is easy to be discharged with the exhaust in the traditional fluidized bed deacidification apparatus causing the yield of the product decreased. The ceramic filter used in the present invention has the properties of high temperature resistance and resistance to chemical corrosion. Another important character of the present invention is that a pulsed gas is applied to the filter every 5~300 seconds for reversing and flapping during the suction filtration to blow the powder material adsorbing at the surface of the filter down inside the deacidification apparatus to keep the system smooth, so as to ensure the stability of the product quality.

2. The deacidification apparatus is covered by an efficient heat insulation material which is a porous material made of a porous superfine powder, a glass fiber, a binding material and a heat radiation cover agent. The thermal conductivity of the heat insulation material is 0.03~0.09 W/(m·K) at 500 degrees Celsius. When the deacidification apparatus is covered by such layer of insulation material with a thickness of 20-100 mm, even the temperature inside the deacidification apparatus is above 500 degrees Celsius, the temperature outside the deacidification apparatus can remains below 50 degrees Celsius, so the present invention can prevent heat loss, reduce energy consumption, consume 50 percent less energy than traditional means, and make the temperature inside the deacidification furnace less than that required in the traditional process, while a same or even better deacidification effect can be got.

3. The deacidification process of the present invention can effectively reduce the effective height (length) of the deacidification apparatus. In the traditional process, in order to effectively remove the acid gas adsorbing at the surface of the oxide powder material, the deacidification must be guaranteed to last a long time, so it needs to increase the height of the deacidification apparatus to extend the time of the powder material staying in the furnace, and sometimes even level 2 or 3 deacidification is needed. Another approach to achieve good deacidification effects in the traditional process is to increase the temperature inside the deacidification furnace. Because of the suction filtration used in the present invention which can remove the acid gas adsorbing at the surface of the oxide powder material effectively even at low temperatures, and the efficient heat insulation material used in the deacidification furnace, the effective height of the deacidification apparatus can be reduced, the investment cost can be saved, and the temperature inside the furnace can be lowered to reduce energy consumption.

BRIEF DESCRIPTION OF THE DRAWINGS

FIG. 1 is a schematic diagram illustrating a deacidification apparatus according to one embodiment of the present invention.

REFERENCE SIGNS

1 gas-solid mixture inlet, 2 filtered air port, 3 exhaust outlet, 4 filter plate, 5 filter, 6 filter barrel, 7 flange, 8 deacidification barrel, 9 assisted heating system, 10 superheated vapor inlet, 11 heat insulation material, 12 high temperature air inlet, 13 product outlet and 14 slag discharging outlet.

DETAILED DESCRIPTION OF THE PREFERRED EMBODIMENTS

The present invention provides an efficient deacidification apparatus and a deacidification process using the apparatus, which uses technique of suction filtration for deacidification at high temperatures in the case where there is an assisted medium and has the features of low energy consumption and high efficiency. A filter apparatus is provided on top of the deacidification furnace and a ceramic filter is connected to a vacuum-pumping device, which can maintain stable vacuum in the system by which the acid gas desorbed from the surface of the powder at high temperatures can be quickly sucked out. Meanwhile, a pulsed gas is applied to the filter for reversing and flapping to remove the powder adsorbing at the surface of the filter to prevent the filter from blocking. Hot air and water vapor are delivered as deacidification assisted gas to improve the deacidification efficiency during deacidification. Moreover, in order to achieve the purpose of reducing energy consumption, the outer wall of the deacidification apparatus is covered by a layer of heat insulation material containing silicon, so as to prevent heat loss to achieve energy saving purposes.

DETAILED DESCRIPTION OF THE PREFERRED EMBODIMENTS

The present invention may be best understood by reference to the following description taken in conjunction with the accompanying drawings.

Example One

FIG. 1 is a schematic diagram illustrating a deacidification apparatus according to one embodiment of the present invention.

The deacidification apparatus includes a deacidification furnace, of which a furnace upper section, a furnace middle section and a furnace lower section are provided in upper, middle and lower portions respectively. The furnace upper section, the furnace middle section and the furnace lower section are connected by a flange 7. The furnace middle section is cylindrical, the furnace lower section forms a cone with a decreasing diameter downward, and the diameter of the furnace upper section is larger than that of the furnace middle section. A gas-solid mixture inlet 1, a exhaust outlet 3 and a filtered air port 2 are provided on the furnace upper section, a product outlet 13 is provided on the furnace lower section, and a filter plate 4 is provided on the furnace upper section, by which the filter 5 is mounted on the furnace upper section (filter barrel 6). The total filter area is larger than 60 m². The gas-solid mixture inlet 1, the exhaust outlet 3 and the filtered air port 2 are connected to the filter 5, the filtered air port is connected with a gas pulse device and a vacuum device by a three-way connecting device, and a plurality of valves are used, wherein when vacuumizing, a valve connected with the gas pulse device is closed, and when delivering pulsed gas, a valve connected with the vacuum device is closed, and the exhaust outlet is connected with atmosphere or connected with the vacuum device.

Use the above deacidification apparatus for deacidification. As shown in FIG. 1, the power material enters into the deacidification apparatus through the gas-solid mixture inlet 1 after gas-solid separation. The filter has a high breathable film cartridge or ceramic cartridge, and the cartridge has a pore size of 1 to 10 um, and a porosity of more than 80%. In the embodiment, the filter includes a plurality of cylindrical microporous ceramic cartridges uniformly distributed on the filter plate 4 which is used to fasten the cartridges. The filter can be vacuumed by the filtered air port 2 to maintain the pressure among −4000~−8000 Pa. The gas-solid mixture that enters in by the gas-solid mixture inlet 1 is adsorbed to the filter by vacuum that the acid gas adsorbing on the surface of the power material can be remove effectively under vacuum. Meanwhile, a pulsed gas is applied to the filter every 30~600 seconds for reversing and flapping during the suction filtration to remove the powder material adsorbing at the surface of the filter into the deacidification barrel 8, so as to prevent the filter from blocking. The furnace middle section (middle of the deacidification barrel 8) is provided with a superheated vapor inlet 10, by which the superheated vapor that has a temperature of 110~180 degrees Celsius can be delivered to further remove the acid gas adsorbing on the surface of the power material. The bottom of the deacidification barrel (the furnace middle section) is provided with a high temperature air inlet 12, by which a high temperature air that has a temperature of 100~300 degrees Celsius can be delivered to assist in deacidification. The powder material deadsorbed from the cartridges is fully fluidized in the deacidification barrel in the delivering of the superheated vapor and the high temperature air, such that the powder is blown to be dispersed to prevent the powder material from caking. The powder material running from the deacidification barrel enters into the cone section of the deacidification apparatus, a product outlet 13 is provided in the middle of the cone section, through which the deacidified powder material enters into a silo, and a row of slag discharging outlets 14 are provided on the bottom of the furnace lower section, by which the powder material that has relatively large particles or is caked can be discharged. An assisted heating system is provided in the furnace middle section and furnace lower section, by which the deacidification barrel can be heated to ensure the temperature inside the deacidification apparatus. The deacidification furnace is covered by an layer of efficient heat insulation material 11. The heat insulation material is a porous material and prepared by mixing p 20~80 wt % porous superfine powder, 0~30 wt % reinforcement fiber, 0~10 wt % binding material and 0~40 wt % heat radiation cover agent evenly and then pressing the mixture to make it be shaped, where the superfine powder can be one or more selected from the group consisting of fumed silica, silica aerogel, precipitated silica, silicoglaserite and vermiculite, the reinforcement fiber can be one or more selected from the group consisting of glass fiber, quartz glass fiber, boron fiber and ceramic fiber, the binding material can be one or more selected from the group consisting of water glass, silane coupling agent and resin, and the heat radiation cover agent can be one or two selected from the group consisting of titanium dioxide and silicon carbide. The superfine powder, the reinforcement fiber, the binding material and the heat radiation cover agent are accounted for 100%. The thermal conductivity of the heat insulation material is 0.03~0.09 W/(m·K) at 500 degrees Celsius. In general, the deacidification apparatus is covered by such layer of heat insulation material with a thickness of 20-100 mm. Even the temperature inside the deacidification apparatus is above 500 degrees Celsius, the temperature outside the deacidification apparatus can remains below 50 degrees Celsius, so as to prevent heat loss, reduce energy consumption, consume 50 percent less energy than traditional means, and make the temperature inside the deacidification furnace less than that required in the traditional process, while a same or even better deacidification effect can be got.

Example Two

A deacidification process in accordance with the embodiment includes:

delivering a gas-solid mixture containing powders into the filter 5 by the gas-solid mixture inlet of the deacidification apparatus of Example One, carrying out suction filtration under vacuum, and discharging the acid gas on the surface of the mixture through the exhaust outlet 3 of the above deacidification apparatus, where the ceramic cartridge used in the deacidification apparatus has an aperture of 5 um, the porosity is 85%, and the total filter area is 72 m², and where a pulsed gas is applied to the filter every 200 seconds for reversing and flapping during the suction filtration with a pressure of −6000 Pa to remove the powder material adsorbing at the surface of the filter; and driving the filtered powder into the furnace middle section of the deacidification furnace of the above deacidification apparatus, carrying out high temperature deacidification by heating from the assisted heating system 9, and carrying out assisted deacidification by delivering superheated vapor (165 degrees Celsius) and high temperature air, where the high temperature air is a nitrogen gas with the temperature of 280 degrees Celsius.

The efficient heat insulation material is pressed for shaping from a fumed silica accounting for 80%, a glass fiber accounting for 10% and a titanium dioxide accounting for 10% after mixed evenly, and the thickness of the heat insulation material for coating is 20 mm.

The flow of the fumed silica is 220 kg/h. The PH value of the suspension aqueous solution of the deacidified fumed silica accounting for 4% is 5.0.

Example Three

The deacidification apparatus and the deacidification process using it of the embodiment are similar to those of Example Two, and the differences are as follows. In the embodiment, the ceramic cartridge used in the deacidification apparatus has an aperture of 10 um, the porosity is 95%, the total filter area is 72 m$^2$, a pulsed gas is applied to the filter every 600 seconds for reversing and flapping during the suction filtration with a pressure of −4000 Pa, the temperature of the superheated vapor is 180 degrees Celsius, the high temperature air is a nitrogen gas with the temperature of 300 degrees Celsius, and the flow of the fumed silica is 220 kg/h.

The efficient heat insulation material is pressed for shaping from a fumed silica accounting for 50%, a glass fiber accounting for 15%, a sodium silicate accounting for 5% and a titanium dioxide accounting for 30% after mixed evenly, and the thickness of the heat insulation material for coating is 50 mm.

The PH value of the suspension aqueous solution of the deacidified fumed silica accounting for 4% is 4.8.

Example Four

The deacidification apparatus and the deacidification process using it of the embodiment are similar to those of Example Two, and the differences are as follows. In the embodiment, the ceramic cartridge used in the deacidification apparatus has an aperture of 5 um, the porosity is 95%, the total filter area is 80 m$^2$, a pulsed gas is applied to the filter every 100 seconds for reversing and flapping during the suction filtration with a pressure of −8000 Pa, the temperature of the superheated vapor is 125 degrees Celsius, the high temperature air is a nitrogen gas with the temperature of 200 degrees Celsius, and the flow of the fumed silica is 220 kg/h.

The efficient heat insulation material is pressed for shaping from a fumed silica accounting for 20%, a glass fiber accounting for 30%, a aminopropyltriethoxysilane (KH-550) accounting for 10% and a titanium dioxide accounting for 40% after mixed evenly, and the thickness of the heat insulation material for coating is 100 mm, The PH value of the suspension aqueous solution of the deacidified fumed silica accounting for 4% is 4.5.

Example Five

The deacidification apparatus and the deacidification process using it of the embodiment are similar to those of Example Four, and the differences are as follows. In the embodiment, the temperature of the superheated vapor is 175 degrees Celsius, the high temperature air is a nitrogen gas with the temperature of 450 degrees Celsius, the deacidification furnace is covered by a traditional cotton insulation, the flow of the fumed silica is 220 kg/h, and the PH value of the suspension aqueous solution of the deacidified fumed silica accounting for 4% is 4.2.

Example Six

In the embodiment, the deacidification process uses a traditional deacidification furnace, where the temperature of the superheated vapor is 175 degrees Celsius, the high temperature air is a nitrogen gas with the temperature of 650 degrees Celsius, the deacidification furnace is covered by a traditional cotton insulation, the flow of the fumed silica is 220 kg/h, and the PH value of the suspension aqueous solution of the deacidified fumed silica accounting for 4% is 3.8.

The described embodiments of the invention are presented for the purpose of illustration and not of limitation. Alternative embodiments will become apparent to those skilled in the art to which the present disclosure pertains without departing from its spirit and scope.

What is claimed is:

1. A deacidification apparatus comprising a deacidification furnace,
wherein the upper, middle and lower portions of the deacidification furnace are respectively called as a furnace upper section, a furnace middle section and a furnace lower section, wherein a gas-solid mixture inlet, a exhaust outlet and a filtered air port are provided in the furnace upper section, a product outlet is provided in the furnace lower section, a filter is mounted in the furnace upper section, and the gas-solid mixture inlet, the exhaust outlet and the filtered air port are all communicated with the filter, the filtered air port is connected with a gas pulse device and a vacuum device via a three-way connecting device; the exhaust outlet is communicated with atmosphere or the vacuum device; an assisted heating system is provided in the furnace middle and lower sections, and a superheated vapor inlet and a high temperature air inlet are provided in the furnace middle section.

2. The deacidification apparatus of claim 1, wherein the furnace middle section is cylindrical, the furnace lower section forms a cone with a decreasing diameter downward, and the diameter of the furnace upper section is larger than that of the furnace middle section.

3. The deacidification apparatus of claim 1, wherein the furnace upper section is provided with a filter plate by which the filter is mounted in the furnace upper section.

4. The deacidification apparatus of claim 1, wherein the filter has a high breathable film cartridge or ceramic cartridge, and the cartridge has a pore size of 1 to 10 urn, and a porosity of more than 80%.

5. The deacidification apparatus of claim 4, wherein the cartridge is a ceramic cartridge.

6. The deacidification apparatus of claim 1, wherein the deacidification furnace is covered by a layer of heat insulation material with a thickness of 20-100 mm.

7. The deacidification apparatus of claim 6, wherein the layer of heat insulation material is prepared by mixing 20~80 wt % porous superfine powder, 0~30 wt % reinforcement fiber, 0~10 wt % binding material and 0~40 wt % heat radiation cover agent evenly and then pressing the mixture; the superfine powder is one or more selected from the group consisting of fumed silica, silica aerogel, precipitated silica, silicoglaserite and vermiculite; the reinforcement fiber is one or more selected from the group consisting of glass fiber, quartz glass fiber, boron fiber and ceramic fiber; the binding material is one or more selected from the group consisting of water glass, silane coupling agent and resin; the heat radiation cover agent is one or two selected from the group consisting of titanium dioxide and silicon carbide; and the total amount of the superfine powder, the reinforcement fiber, the binding material and the heat radiation cover agent is 100%.

8. A deacidification process, comprising:
Step a, delivering a gas-solid mixture containing powders into a filter via the gas-solid mixture inlet of the deacidification apparatus of claim 1, closing a valve connected with the gas pulse device, carrying out suction filtration under vacuum, and discharging acid gas at a surface of the mixture through the exhaust outlet of the deacidification apparatus; and Step b, allowing the filtered powder enter into the furnace middle section of the deacidification furnace of the deacidification apparatus, carrying out high temperature deacidification under the heating of the assisted heating system, and delivering superheated vapor and high temperature air to perform an assisted deacidification.

9. The deacidification process of claim 8, wherein the pressure exerted in the suction filtration is −4000 to −8000 Pa in Step a, a pulsed gas is applied to the filter every 30~600 seconds for reversing and flapping during the suction filtration, and the valve connected with the vacuum device is closed when applying the pulsed gas.

10. The deacidification process of claim 8, wherein the delivered superheated vapor has a temperature of 110~180 degrees Celsius, and the delivered high temperature air has a temperature of 100~300 degrees Celsius in Step b.

\* \* \* \* \*